(12) United States Patent
Merino Lopez et al.

(10) Patent No.: US 8,479,788 B2
(45) Date of Patent: *Jul. 9, 2013

(54) TIRE COMPRISING A TREAD WITH RUBBERY FOAM

(75) Inventors: José Merino Lopez, Riom (FR); Pierre-Yves Jeanne, Clermont-Ferrand (FR)

(73) Assignees: Compagnie Generale des Establissements Michelin, Clemont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 525 days.

This patent is subject to a terminal disclaimer.

(21) Appl. No.: 12/667,307

(22) PCT Filed: Jun. 13, 2008

(86) PCT No.: PCT/EP2008/004760
§ 371 (c)(1),
(2), (4) Date: Apr. 23, 2010

(87) PCT Pub. No.: WO2009/003576
PCT Pub. Date: Jan. 8, 2009

(65) Prior Publication Data
US 2010/0200133 A1    Aug. 12, 2010

(30) Foreign Application Priority Data
Jul. 2, 2007 (FR) ...................... 07 04843

(51) Int. Cl.
*B60C 11/00*    (2006.01)
(52) U.S. Cl.
USPC .................................... 152/209.5; 152/209.7
(58) Field of Classification Search
USPC ........................................... 152/209.5, 209.7
See application file for complete search history.

(56) References Cited

U.S. PATENT DOCUMENTS 5,176,765 A      1/1993  Yamaguchi et al.
5,351,734 A  * 10/1994  Mouri et al. ................ 152/209.4
(Continued)

FOREIGN PATENT DOCUMENTS

EP    0873884 A2   10/1998
EP    1052270 A1   11/2000
(Continued)

OTHER PUBLICATIONS

English translation of Kawaguchi (JP62-283001), Dec. 1987.*
(Continued)

*Primary Examiner* — Steven D Maki
*Assistant Examiner* — Robert Dye
(74) *Attorney, Agent, or Firm* — Buchanan Ingersoll & Rooney PC

(57) ABSTRACT

Tire comprising at least one carcass-type reinforcing structure anchored on each side of said tire in a bead whose base is intended to be mounted on a rim seat, each of said beads extending generally radially outwardly in the form of sidewalls, the sidewalls being connected radially towards the outside to a tread, the carcass-type reinforcing structure extending circumferentially from the bead towards said sidewall, a crown reinforcing structure, each of the beads also comprising an anchoring region for holding the reinforcing structure in place, wherein said tread comprises an inner layer of substantially incompressible rubbery material and an outer layer of compressible rubbery foam wherein:

Figure 1:
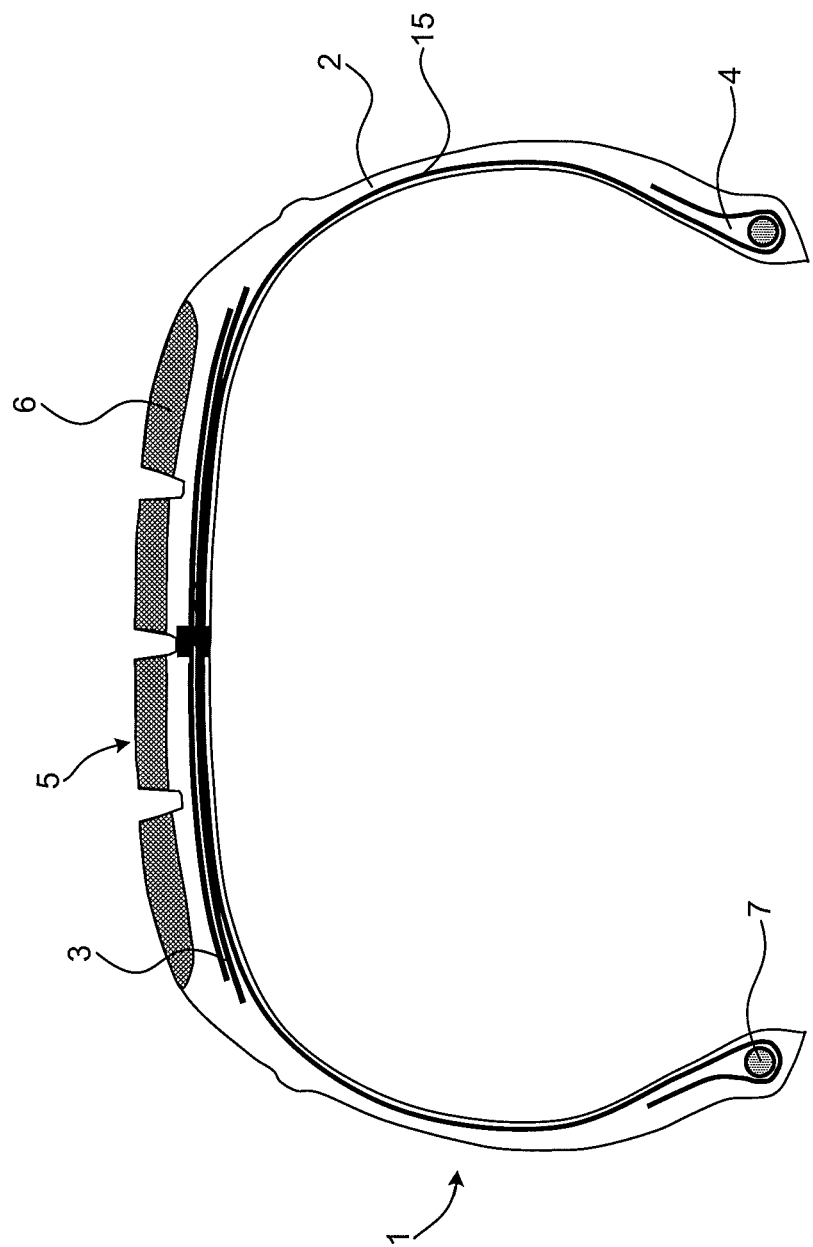

the foam expansion ratio is greater than 50%;
  the thickness of the layer is greater than 2.0 mm and preferably greater than 4 mm; and
  the outer layer has a Shore A hardness of less than 30 and preferably of between 10 and 20 Shore A.

13 Claims, 6 Drawing Sheets

U.S. PATENT DOCUMENTS

| | | | |
|---|---|---|---|
| 7,926,529 B2 | 4/2011 | Ferlin | |
| 2004/0040638 A1* | 3/2004 | Cole, III | 152/450 |
| 2006/0174988 A1 | 8/2006 | Ferlin | |

FOREIGN PATENT DOCUMENTS

| | | | |
|---|---|---|---|
| EP | 1447426 A1 | | 8/2004 |
| FR | 2860184 A1 | | 4/2005 |
| JP | 62-283001 A | | 12/1987 |
| JP | 03-143707 | * | 10/1989 |
| JP | 2-189203 A | | 7/1990 |
| JP | 11-020408 | * | 1/1999 |
| JP | 11/078406 A | | 3/1999 |
| JP | 2901257 | * | 6/1999 |
| JP | 2000/062413 A | | 2/2000 |
| JP | 2007/507385 A | | 3/2007 |
| JP | 2007/131084 A | | 5/2007 |
| WO | WO2005/063510 | * | 7/2005 |

OTHER PUBLICATIONS

HCM Holding Rubber Foam, [retrieved on Mar. 18, 2010]. Retrieved from the Internet: <URL: http://www.hcmchina.cn/EN/pro__Introduce.asp>.*

International Search Report (PCT/ISA/210) for PCT/EP2008/004760 mailed Jul. 23, 2008.

* cited by examiner

TIRE COMPRISING A TREAD WITH RUBBERY FOAM

The present invention relates to a tire with optimal grip and noise characteristics.

For some years now, tire manufacturers have been making strenuous efforts in order to develop original solutions allowing to obtain tires with greater grip than has been achieved with conventional products. Usually this emphasis on performance is obtained at the cost of other characteristics of the tire. As a matter of fact, numerous technical characteristics of this product are contradictory, with the conventional consequence that an improvement in one or two characteristics often leads to deterioration in other characteristics. Several performance types allow to illustrate this rule well. Grip is a good example.

To improve the grip performance of a product, it is conventional practice to use a two-layer tread configuration, with an outer layer whose hardness is less than that of the inner layer. There are several types of solutions allowing to obtain an outer layer whose hardness is less than that of the inner layer. Conventionally, for example, a layer of a material with a low Shore hardness creates significant constraints when it comes to efficient industrial use because it is difficult to handle, and, because the material is particularly sticky. It adheres to the tools and machines, which results in significant disruption of the process.

Document EP 0 873 884 describes a solution wherein the expansion ratio of the outer layer is between 1% and 100%. That document specifies that an expansion ratio of greater than 100% has several major disadvantages such as reduced wear resistance and difficulty in producing a stable shape when the tire is manufactured.

Document FR 2 860 184 describes a foam tread whose stiffness is very low, with expansion ratios of greater than 500%. This tread is configured to be used in tires for very heavy vehicles, in order to limit damage to the ground. These machines also move at very slow speeds.

To overcome these various disadvantages, the present invention provides a tire comprising at least one carcass-type reinforcing structure anchored on each side of said tire in a bead whose base is intended to be mounted on a rim seat, each of said beads extending generally radially outwardly in the form of sidewalls, the sidewalls being connected radially towards the outside to a tread, the carcass-type reinforcing structure extending circumferentially from the bead towards said sidewall, a crown reinforcing structure, each of the beads also comprising an anchoring region for holding the reinforcing structure in place, wherein said tread comprises an inner layer of substantially incompressible rubbery material and an outer layer of compressible rubbery foam wherein:
- the foam expansion ratio is greater than 50%;
- the thickness of the layer is greater than 2.0 mm and preferably greater than 4 mm; and
- the outer layer has a Shore A hardness of less than 30 and preferably of between 10 and 20 Shore A.

Surprisingly, and contrary to expectation, it has been observed that the foam layer does not cause a very significant deterioration in the behavior of the tire. In fact, once crushed or sheared, the stiffness reverts to acceptable levels. The time necessary for crushing is not a problem for driving. Further, improvements are also observed in grip. The rate of wear achieved with such an architecture is moreover of an acceptable level, especially in urban usage. In any case, the slight diminutions in performance in terms of behavior and wear are amply compensated for by substantial improvements in grip.

Conventionally, layers of reduced hardness are obtained by using oil and/or plasticizers in the matrix of a material that is conventionally relatively hard. This method of reducing hardness has the drawback that it makes the material sticky and difficult to process. The embodiments of the invention do not use such agents. Instead, a modified structure of the material, comprising cells, is used.

The tire according to the invention is advantageously used for tires intended for mounting on passenger cars or vehicles.

Conventionally, a layer of a material with a low Shore hardness creates significant constraints when it comes to efficient industrial use because it is difficult to handle, and, because the material is particularly sticky. It adheres to the tools and machines, which results in significant disruption of the process. By using, in accordance with the invention, a cellular structure which allows the hardness to be reduced by a mechanical or structural effect rather than by using a layer of a material whose hardness is reduced with chemical agents, these problems are solved. The presence of a layer of a compressible material means that as the tire rolls, it envelops the asperities of the ground. This phenomenon contributes to a reduction in local impacts and a better distribution of the pressure forces.

The noise reduction achieved with the invention is around 3 to 4 decibels or even more. This reduction is moreover spread over a very wide frequency spectrum (for example, between 50 and 800 Hz in some tests). Moreover, the noise reduction concerns both noise transmitted through solid objects (through the structure of the vehicle, up to about 500 Hz) and noise transmitted by the air (from around 500 Hz up).

This reduction is due to the use of an outer layer with a reduced modulus.

The stiffness of the matrix of the outer layer is preferably greater than 55 Shore A and preferably greater than 65 Shore A.

According to one advantageous embodiment, the tire comprises an intermediate layer situated between the outer layer and the inner layer, the intermediate layer having an expansion ratio less than that of the outer layer.

Said intermediate layer preferably has an expansion ratio of at least 20% and preferably at least 50% less than that of the outer layer.

According to one advantageous variant, the thickness of the outer layer is less than the depth of the tread blocks of the tire.

According to another variant, the thickness of the outer layer is greater than the depth of the tread blocks of the tire.

Advantageously, the outer layer consists mainly of closed cells. Said cells are preferably not pressurized.

The compositions of the rubbery materials of the inner layer and of the matrix of the outer layer are advantageously identical.

According to one advantageous variant, the tire comprises a region of protection of the borders of the outer layer with at least one material whose expansion ratio is less than 10% and preferably less than 2% and whose thickness is greater than 0.5 mm.

According to another advantageous variant, the tire comprises a region of protection of the borders of the outer layer with the addition of at least one bielastic fabric, such as Lycra (registered trade mark). Such a fabric can be used anywhere outside of the outer layer, such as for example on the surface of the tread). Such a fabric has the advantage that it conforms fully to the tread blocks during the molding stage.

Protective components of this kind are very effective at protecting the outer layer in the event of a serious skid or drift.

Figure 2:
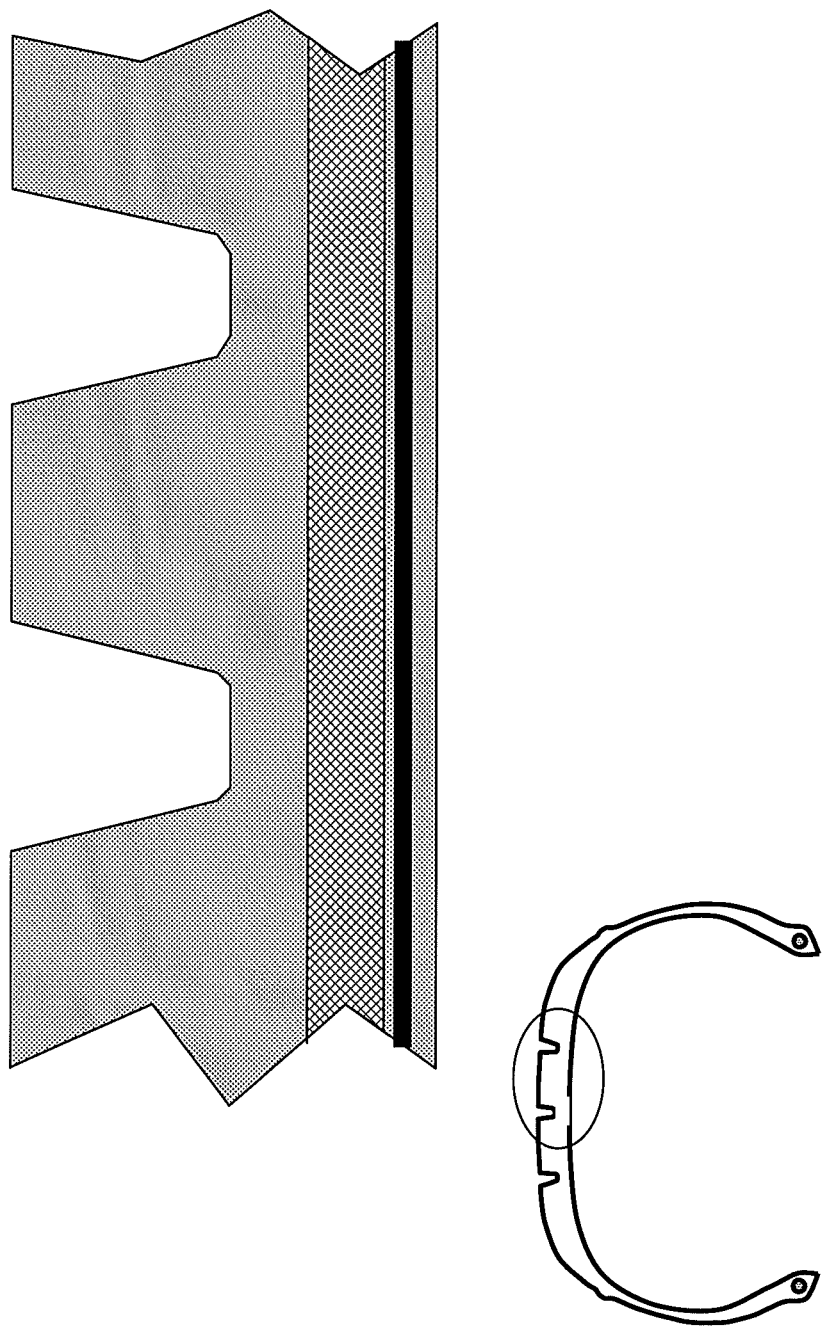

All the details of construction are given in the following description, completed by FIGS. 1 to 6, in which:

FIG. 1 shows an illustrative embodiment of a tire according to the invention seen in transverse section FIG. 2 is an enlarged view of a portion of a crown of a conventional tire of known type FIGS. 3 to 6 are enlarged views of a portion of a crown of the tire with various variants In the present description, "sidewalls" means those portions of the tire, usually of low flexural stiffness, situated between the crown and the beads. "Sidewall compound" means the rubbery compounds situated axially outwardly relative to the threads of the reinforcing structure of the carcass and to their bonding rubber. These compounds usually have a low modulus of elasticity.

"Bead" denotes that portion of the tire which is radially inwardly adjacent to the sidewall.

It should be pointed out that "radially upward" or "radially upper" or "radially outward" means towards larger radii.

The expression "based on" is used in the conventional way to mean that the constituent that follows is the majority constituent of the composition.

A carcass-type reinforcing or reinforcement structure will be described as radial when its threads are at 90°, but also, following current terminological usage, at an angle close to 90°.

Conventionally, as presented in FIG. 1, the tire comprises a carcass-type reinforcing or reinforcement structure 15 provided with reinforcements advantageously configured in a substantially radial arrangement. This structure can be arranged continuously from one bead to the other, passing through the sidewalls 2 and the crown 3 of the tire, or alternatively the structure may comprise two or more parts arranged for example along the sidewalls, without covering the whole of the crown.

Two main types of anchoring 4 for the carcass-type reinforcing structure are possible. Typically, as shown in FIG. 1, the turn-up of said structure 15 around a core 7 of the bead provides the anchoring 4 of the carcass-type reinforcing structure in the bead.

Alternatively, the anchoring function can be provided by an arrangement of circumferential threads disposed in the vicinity of the reinforcing structure 15. Circumferential threads arranged preferably in the form of stacks form an arrangement of anchor threads in each bead. These threads are preferably metallic, and may be brass-coated. Various variants advantageously employ textile threads, such as aramid, nylon, PET, PEN, hybrid or other threads, e.g. glass fibers. In each stack the threads are advantageously basically concentric and superposed.

FIGS. 3 to 6 show various examples of how the invention may be carried out. These various examples show how a layer of foam 6 can be positioned in the crown region of the tire. The crown thus comprises an inner layer 8, or rubbery crown compound, consisting of a substantially incompressible rubbery layer, and an outer layer 6 consisting of compressible rubbery foam. The degrees of compressibility/incompressibility are such that the degree of compressibility of the outer layer 6 is substantially greater than that of the inner layer 8.

The region of the crown covered by the foam layer advantageously comprises the tread, as shown in FIG. 1. This region may, in accordance with various alternatives, be wider or narrower than the tread.

The rubbery foam used for the outer layer 6 preferably has an expansion ratio of more than 50%. The thickness of the outer layer 6 is advantageously greater than 2.0 mm and preferably greater than 4 mm.

The outer layer 6 has a Shore A hardness of less than 30 and preferably of between 10 and 20 Shore A. The stiffness of the matrix of the outer layer is preferably greater than 55 Shore A and preferably greater than 65 Shore A.

It is preferable to use compositions of similar rubbery materials to make the inner layer 8 or rubbery crown compound on the one hand, and the matrix of the outer layer 6 on the other. The distinct properties of the outer layer are obtained by specific forming operations on the material in the form of foam.

This rubbery foam preferably consists mostly of closed cells. These cells are preferably not pressurized.

Figure 3:
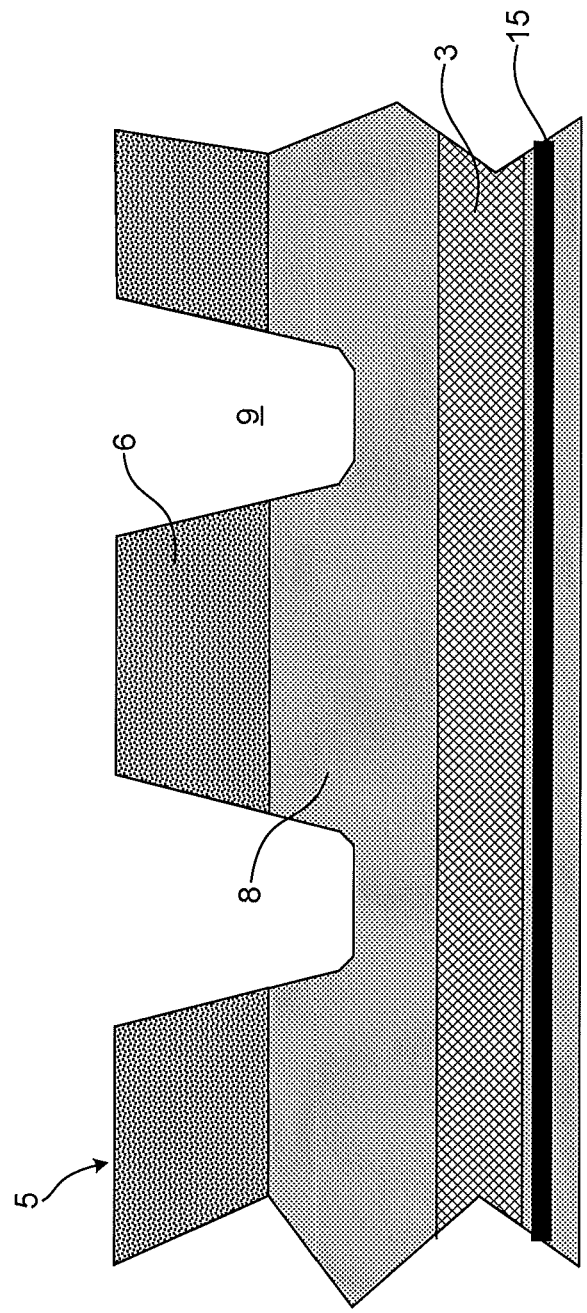

In the example shown in FIG. 3, the thickness of the foam layer is less than the depth of the tread blocks 5 of the tire. It will thus be observed that the tread grooves or channels 9 continue radially inwards further than the thickness of the outer layer 6.

Figure 4:
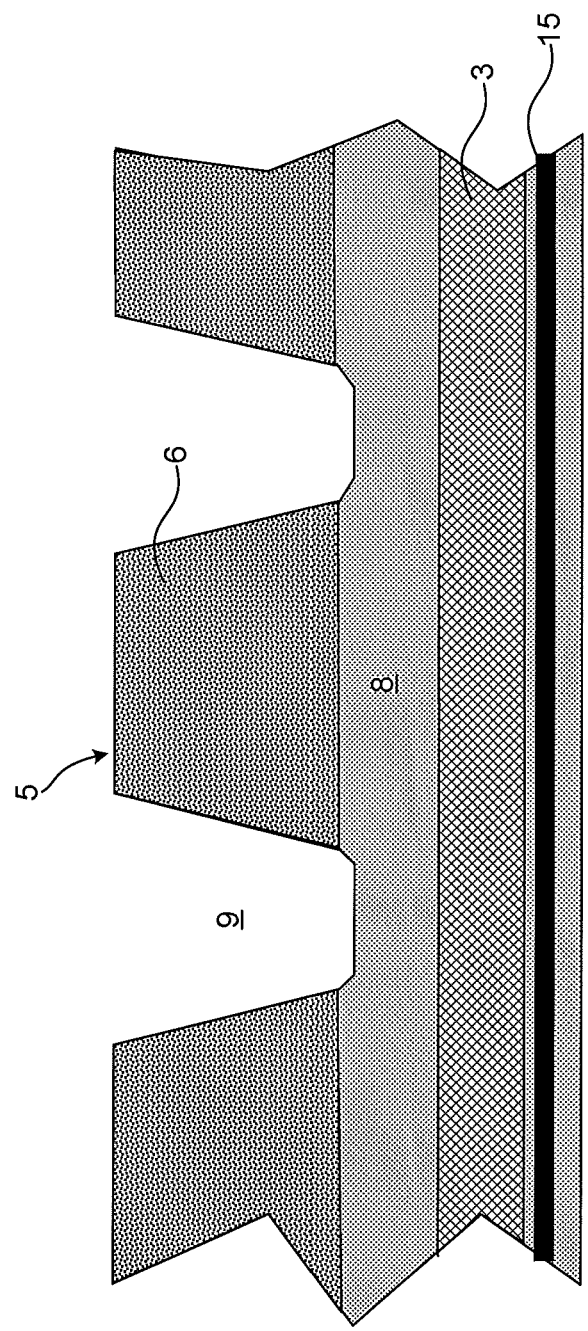
Figure 5:
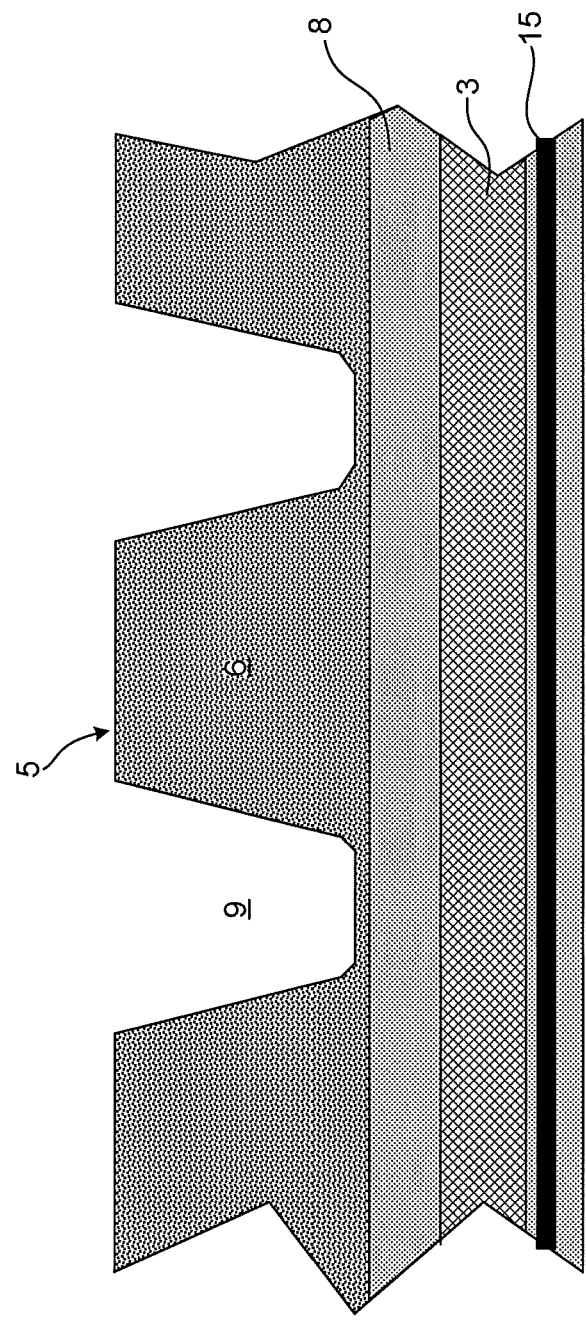

In the example shown in FIG. 4, the thickness of the outer layer is approximately the same as the depth of the channels 9. Lastly, in the example shown in FIG. 5, the thickness of the outer layer 6 is greater than the depth of the channels 9. The channels are therefore entirely situated within the foam. Such an arrangement avoids areas of stress concentration and the risk of cracking between inner and outer layers. The thickness of foam beneath the channels is preferably less than 1 mm.

Figure 6:
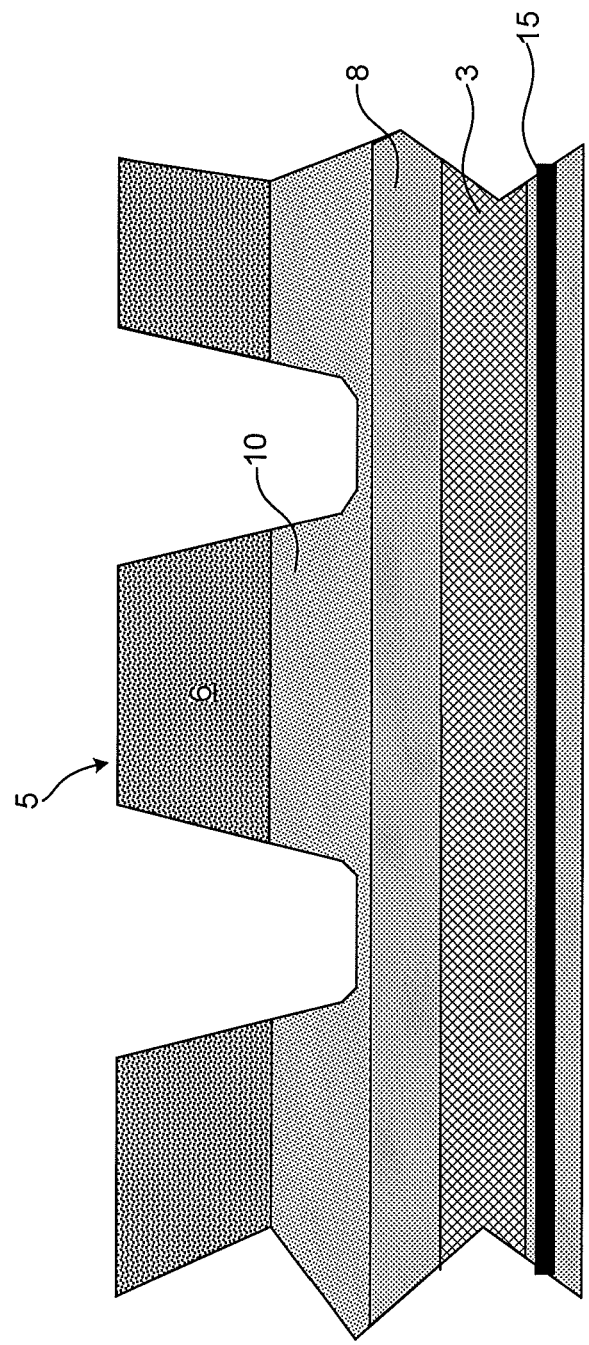

In the example shown in FIG. 6, the crown of the tire has an intermediate layer 10 between the outer layer 6 and the inner layer 8, the intermediate layer having an expansion ratio less than that of the outer layer. In such an example, said intermediate layer may have an expansion ratio of at least 20% and preferably at least 50% less than that of the outer layer.

Lastly, and optionally, the crown region may be provided with a region of protection of at least the borders of the outer layer 6 with the addition of at least one bielastic fabric. Alternatively, there may also be a region of protection of the borders of the outer layer with at least one material whose expansion ratio is less than 10% and preferably less than 2% and whose thickness is greater than 0.5 mm.

The invention claimed is:

1. A tire comprising at least one carcass-type reinforcing structure anchored on each side of said tire in a bead whose base is intended to be mounted on a rim seat, each of said beads extending generally radially outwardly in the form of sidewalls, the sidewalls being connected radially towards the outside to a tread, the carcass-type reinforcing structure extending radially from the bead towards said sidewall, the tire further comprising a crown reinforcing structure, each of the beads also comprising an anchoring region for holding the carcass-type reinforcing structure in place, wherein said tread comprises an inner layer of substantially incompressible rubbery material and an outer layer of compressible rubbery foam wherein:

the foam expansion ratio is greater than 50%;

the thickness of the layer is greater than 2.0 mm; and the outer layer has a Shore A hardness of less than 30 Shore A wherein the tire is adapted for mounting on passenger cars.

2. The tire of claim 1, wherein the stiffness of the matrix of the outer layer is greater than 55 Shore A and preferably greater than 65 Shore A.

3. The tire of claim 1, wherein the compositions of the rubbery materials of the inner layer and of the matrix of the outer layer are identical.

4. The tire of claim 1, wherein the outer layer consists mainly of closed cells.

5. The tire according to claim 4, wherein said cells are not pressurized.

6. The tire of claim 1, comprising an intermediate layer situated between the outer layer and the inner layer, the intermediate layer having an expansion ratio less than that of the outer layer.

7. The tire of claim 6, wherein said intermediate layer has an expansion ratio at least 20% and preferably at least 50% less than that of the outer layer.

8. The tire of claim 1, wherein the tire comprises tread blocks and wherein the thickness of the outer layer is less than the depth of the tread blocks of the tire.

9. The tire of claim 1, wherein the tire comprises tread blocks and wherein the thickness of the outer layer is greater than the depth of the tread blocks of the tire.

10. The tire of claim 1, comprising a region of protection of at least the borders of the outer layer with the addition of at least one bielastic fabric.

11. The tire of claim 1, comprising a region of protection of the borders of the outer layer with at least one material whose expansion ratio is less than 10% and whose thickness is greater than 0.5 mm.

12. The tire of claim 1, wherein the thickness of the layer is and greater than 4 mm.

13. The tire of claim 1, wherein the Shore A hardness is between 10 and 20.

* * * * *